(12) United States Patent
Zhou et al.

(10) Patent No.: US 12,494,711 B2
(45) Date of Patent: Dec. 9, 2025

(54) RESONANT CONVERTER

(71) Applicant: SIGNIFY HOLDING B.V., Eindhoven (NL)

(72) Inventors: Yufei Zhou, Shanghai (CN); Hui Zhang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 60 days.

(21) Appl. No.: 18/699,946

(22) PCT Filed: Oct. 10, 2022

(86) PCT No.: PCT/EP2022/078095
§ 371 (c)(1),
(2) Date: Apr. 10, 2024

(87) PCT Pub. No.: WO2023/061937
PCT Pub. Date: Apr. 20, 2023

(65) Prior Publication Data
US 2024/0421705 A1  Dec. 19, 2024

(30) Foreign Application Priority Data

Oct. 12, 2021 (WO) ................ PCT/CN2021/123327
Nov. 23, 2021 (EP) .................................... 21209741

(51) Int. Cl.
*H02M 3/00* (2006.01)
*H02M 3/155* (2006.01)
(Continued)

(52) U.S. Cl.
CPC ........... *H02M 3/01* (2021.05); *H02M 3/1557* (2021.05); *H02M 3/156* (2013.01); *H05B 45/3725* (2020.01)

(58) Field of Classification Search
CPC ...... H02M 3/01; H02M 3/1557; H02M 3/156; H05B 45/3725
See application file for complete search history.

(56) References Cited

U.S. PATENT DOCUMENTS 9,590,492 B2 *  3/2017  Chang ..................... H02M 1/36
9,787,195 B1 * 10/2017  Xiong ............... H02M 3/33507
(Continued)

FOREIGN PATENT DOCUMENTS

CN  103427688 A  * 12/2013
CN  203984261 U  * 12/2014
(Continued)

OTHER PUBLICATIONS

Veeramallu, V.K. Satyakar et al., "Analysis and Implementation of Soft-Switched Bidirectional Buck-Boost DC-DC Converter for Solar PV-FED LED Street Lighting Systems," Department of Electrical Engineering, National Institute of Technology, John Wiley & Sons, Ltd, 2019 (29 Pages).

(Continued)

*Primary Examiner* — Adam D Houston

(57) ABSTRACT

A resonant converter has a resonant capacitor between the input stage and the output stage. An output inductor arrangement of the output stage has a first inductor component and a second inductor component. A first output is coupled to a reference output by both of the first and second inductor components in series and connects to a first load with a first (high) forward voltage. A second output is coupled to the reference output by only one of the first and second inductor components, and connects to a second load with a second (low) forward voltage. Only one output connects to a corresponding load at one time. This enables a large output (Continued)

voltage range with low total harmonic distortion and/or low voltage stress on the components of the input and output stages.

15 Claims, 11 Drawing Sheets

(51) Int. Cl.
*H02M 3/156* (2006.01)
*H05B 45/3725* (2020.01)

(56) References Cited

U.S. PATENT DOCUMENTS

| | | | | |
|---|---|---|---|---|
| 9,831,787 | B1 * | 11/2017 | Halberstadt | H02M 3/33546 |
| 10,601,332 | B2 * | 3/2020 | Granato | H02M 3/33592 |
| 10,770,978 | B2 * | 9/2020 | Wang | H02M 3/33571 |
| 10,833,594 | B2 * | 11/2020 | Leong | H02M 3/33523 |
| 12,301,125 | B2 * | 5/2025 | McLean | H02M 3/33571 |
| 2005/0018455 | A1 | 1/2005 | Ceruti et al. | |
| 2013/0077356 | A1 * | 3/2013 | Cohen | H02M 3/33507 363/21.02 |
| 2017/0104417 | A1 * | 4/2017 | Hung | H02M 3/3376 |
| 2024/0421705 | A1 * | 12/2024 | Zhou | H02M 3/01 |

FOREIGN PATENT DOCUMENTS

| | | | | |
|---|---|---|---|---|
| CN | 105162315 | A * | 12/2015 | |
| CN | 109274270 | A | 1/2019 | |
| CN | 208723631 | U * | 4/2019 | |
| CN | 113556033 | A * | 10/2021 | H02M 3/07 |
| CN | 119341349 | A * | 1/2025 | H02M 7/5395 |
| CN | 120185415 | A * | 6/2025 | |
| WO | WO-2023061937 | A1 * | 4/2023 | H02M 3/156 |

OTHER PUBLICATIONS

Shi, Chuan, et al., "A SIC-Based High-Efficiency Isolated Onboard PEV Charger With Ultrawide DC-Link Voltage Range," IEEE Transactions on Industry Applications, vol. 53, No. 1, 2017 (11 Pages).

Liang, Tsorng-Juu, et al., "A Novel Two-Stage Electronic Ballast for Hid Lamp With Sepic PFC," Applied Power Electronics Conference and Exposition (APEC), IEEE 2012 (3 Pages).

Margani, Jafar, et al., "A New Dual Output DC-DC Converter Based on Sepic and Cuk Converters," International Symposium on Power Electronics, Electrical Drives, Automation and Motion, 2016 (5 Pages).

Amarnath, Yalavarthi, et al., "SRM Driven Solar Irrigation Pumping System Utilizing Modified Dual Output Sepic Converter," IEEMA Engineer Infinite Converence (ETECHNXT), IEEE 2018 (6 Pages).

* cited by examiner

RESONANT CONVERTER

CROSS-REFERENCE TO PRIOR APPLICATIONS

This application is the U.S. National Phase application under 35 U.S.C. § 371 of International Application No. PCT/EP2022/078095, filed on Oct. 10, 2022, which claims the benefit of International Application No. PCT/CN2021/123327, filed on Oct. 12, 2021 and European Patent Application No. 21209741.4, filed on Nov. 23, 2021. These applications are hereby incorporated by reference herein.

FIELD OF THE INVENTION

This invention relates to resonant converters, for example for use in driving LED arrangements.

BACKGROUND OF THE INVENTION

There is a desire for high performance and low cost resonant converters, for example for use in LED drivers.

Typically, a two stage topology is used for a high performance driver, in particular a non-isolated driver, based on a boost converter and a buck converter or buck-boost converter.

The boost stage achieves high power factor and low total harmonic distortion for a mains input, and the buck (or buck-boost) converter achieves an output low ripple to achieve a high light output quality.

A SEPIC converter (Single Ended Primary Inductor Converter) is a known low cost resonant converter design which can be used instead of a two stage design. It has an input stage (such as a boost stage) and an output stage (such as a buck-boost stage) with a resonant capacitor between the input stage and output stage. There is however a single main switch controlling both the input and output stages. There are other similar types of resonant converters such as a Cuk converter.

Tsomg-Juu Liang et al, "A novel two-stage electronic ballast for HID lamp with SEPIC PFC", 2012 Twenty-Seventh Annual IEEE Applied Power Electronics Conference and Exposition (APEC), 5 Feb. 2012 discloses cascaded SEPIC converter and buck-boost converter, wherein the buck-boost converter has two outputs respectively coupled to one of two coupled incutors. Shi Chuan et al, "A SiC-based high efficiency isolated onboard PEV charger with ultrawide DC-link voltage range", IEEE Transactions on Industry Applications, 1 Jan. 2017 discloses a SEPIC converter.

It is also a customer requirement that a driver can drive different types of load, in particular with different load voltages. For example, customers often require that a same model LED driver can drive LED modules with variable LED forward voltages, such that the LED driver is universal for different applications. In this case, the performance of the driver should be as consistent as possible with the different load voltages. However, it is difficult to design a SEPIC converter, or other low cost driver, for example to achieve the required total harmonic distortion, for a range of different loads. Components of the resonant converter circuit also need to be selected which are able to tolerate the full range of load voltages, and this can result in high cost components with high voltage tolerances.

There is therefore a need for a resonant converter design which facilitates meeting circuit performance requirements with low cost components.

SUMMARY OF THE INVENTION

The invention is defined by the claims.

It is a concept of the invention to provide an output inductor of a resonant converter with two inductor components in series, so that a first output is defined across both inductor components and a second output is defined across only one of the inductor components. A selected one output connects to a corresponding load at one time. The principle of the embodiments of the invention is that the magnetic coupling between the first inductor and the second inductor effectively converts the large output voltage range into a smaller effective output voltage range for the resonant converter, for which smaller effective voltage range the resonant converter can maintain its performance. Thus the same resonant converter can support the large output voltage range. This enables the resonant converter to be able to operate with a large output voltage range while maintaining low total harmonic distortion and/or low voltage stress on the resonator components.

According to examples in accordance with an aspect of the invention, there is provided a resonant converter comprising:
an input stage;
an output stage comprising an output inductor arrangement; and
a resonant capacitor between the input stage and the output stage;
wherein at least part of the output inductor arrangement of the output stage is adapted to be electrically connected in parallel with said resonant capacitor and charged by said resonant capacitor,
wherein the output inductor arrangement comprises a first inductor component and a second inductor component magnetically coupled to each other, and wherein the output stage further comprises:
a first output coupled to a reference output by both of the first inductor component and the second inductor component in series and adapted to connect to a first load with a first forward voltage, wherein the first inductor component and the second inductor component is adapted to convert the output voltage into a smaller effective output voltage for the resonant converter; and
a second output coupled to the reference output by only one of the first and second inductor components, and adapted to connect to a second load with a second forward voltage smaller than the first forward voltage,
wherein a selected one of the first output and the second output is adapted to connect to either the first or the second load respectively at one time.

This resonant converter is for example a SEPIC converter, with a resonant capacitor between input and output stages. The resonant converter is for example for use as part of a non-isolated LED driver. The input stage is for providing high power factor and low total harmonic distortion and the output stage is for achieving low output current ripple.

The converter is designed for use with a large output voltage range, such as 50V to 200V. In order to enable a low total harmonic distortion and/or to avoid high voltage stress on the components of the input and output stages (such as a main power switch and the resonant capacitor), two separate outputs are provided, each for use with a load with different output voltages. For example, when it is required to drive a LED load with relatively high voltage such as 100V to 200V, the converter is adapted to connected to the LED load via the first output; and when it is required to drive a LED load with relatively low voltage such as 50V to 100V, the converter is adapted to connected to the LED load via the second output.

In a detailed embodiment, for example the input stage comprises a boost converter and the output stage comprises a buck converter or a buck-boost converter, wherein a main control switch is shared between the boost converter as the input stage and the buck converter or the buck-boost converter as the output stage. This defines a SEPIC architecture.

The resonant capacitor is then connected between the main control switch and the output inductor arrangement.

As will be discussed below, a traditional SEPIC architecture suffers from large voltage stress on its resonant capacitor and/or THD deterioration when the SEPIC architecture connects to load with different voltages. Thus the above embodiment can improve the flexibility of the SEPIC architecture in driving loads with different voltages.

When the first output is connected to the first load, the resonant converter is adapted to work with a first circuitry parameter and a first loading parameter, and when the second output is connected to the second load, the resonant converter is adapted work with a second circuitry parameter and a second loading parameter, and the difference between the first and second circuitry parameters is less than the first threshold, and/or the difference between the first and the second loading parameters is less than the second threshold such that the performance of the resonant converter is maintained with respect to the first load and the second load.

A difference between the first and second circuitry parameters is for example less than a first threshold, and a difference between the first and the second loading parameters is less than a second threshold. In this way, since the resonant converter works with comparable circuitry parameters and loading parameters in driving the first load and the second load, the resonant converter's performance does not vary too much. More specifically, the difference of voltage stress (loading) on the resonant components can be reduced such that a properly rated resonant component can support both the first load and the second load. Additionally or alternatively, a total harmonic distortion of the resonant converter does not vary much with the first load voltage and the second load voltage, thus the resonant converter can be designed more easily.

The inventors of the invention observe that a voltage stress on the resonant component, such as the resonant capacitor, is relevant with the inductance of the output inductor arrangement and the output voltage. Thus, the inventors propose to reduce the difference of the effective inductance of the output inductor arrangement and/or the effective output voltage as much as possible, given the largely different first load voltage and second load voltage.

In a first circuit implementation, the first circuitry parameter comprises a first equivalent inductance of the output inductor arrangement, and the second circuitry parameter comprises a second equivalent inductance of the output inductor arrangement, wherein the first and the second equivalent inductances are substantially same.

In this first circuit implementation, the first loading parameter for example comprises a first equivalent output voltage of the resonant converter, and the second load parameter comprises a second equivalent output voltage of the resonant converter.

In one approach, the difference between the first and second equivalent output voltages is smaller than the difference between the first and second forward voltages such that the voltage stresses on the resonant capacitor when connected to the first load and to the second load are both less than a stress threshold.

The equivalent output voltage is for example the output voltage at the second output.

The inductances of the first and second inductor components are for example the same, the first equivalent output voltage is half of the first forward voltage, and the second equivalent output voltage is the second forward voltage. More specifically, in this embodiment, the difference is half of the first forward voltage minus the second forward voltage, which is smaller than a difference of the first forward voltage minus the second forward voltage for the traditional SEPIC converter.

In this way, the effective inductance of the output inductor arrangement is the same for different output voltage, and a difference of the effective output voltages is reduced. In turn, the voltage stress on the resonant capacitor for both the first load and the second load is less than a voltage threshold. This effectively keeps the voltage stress on the resonant capacitor below a threshold so that a lower specification component may be used. For example, a relatively lower rated resonant capacitor can tolerate both the voltage stress for the first load and the voltage stress for the second load.

In a realization of this first circuit implementation:
the resonant capacitor is connected to a junction between the first and second inductor components;
the first inductor component is connected between the reference output and the junction;
the second inductor component is connected at a first end to the junction;
the second inductor component is connected at a second end to the first output through a first diode; and
the junction is connected to the second output through a second diode.

The resonant capacitor in this case connects to the midpoint of the two series inductor components. Thus, for a high voltage load, the capacitor is not directly connected to the high voltage load.

In order to further buffer the output of the resonant converter, a first output capacitor may be connected between the reference output and the second output so as to buffer the second output, and a second output capacitor may be connected between the second output and the first output such that the first and second output capacitors buffer the first output.

The inventors of the invention also observe that a total harmonic distortion of the resonant converter is relevant with the output inductor's voltage. Thus, the inventors propose to reduce a difference of the output inductor's effective voltages, given the first load voltage and the second load voltage. Therefore, the total harmonic distortion of the resonant converter is more constant for the first load voltage and the second load voltage, and by a proper design, both total harmonic distortions can stay within the standard more easily.

More specifically, in a second circuit implementation, the first loading parameter comprises a first inductor voltage of the output inductor arrangement as seen by the resonant capacitor, and the second loading parameter comprises a second inductor voltage of the output inductor arrangement as seen by the resonant capacitor, wherein the difference between the first inductor voltage when connected to the first load and the second inductor voltage when connected to the second load is smaller than the difference between the first and second forward voltages such that both the total harmonic distortions when connected to the first load and when connected to the second load are below the required level.

In this way, the effective inductor voltages as seen by the resonant capacitor are made closer, and the total harmonic distortions of the resonant converter when connected to the first load and when connected to the second load are made to be similar, so that the total harmonic distortion can be kept below a threshold for both types of loads.

The inductances of the first and second inductor components are for example the same, the first inductor voltage is the first forward voltage, and the second inductor voltage is twice the second forward voltage.

By doubling the second forward voltage as the second inductor voltage, the second inductor voltage for the second load gets closer to the first inductor voltage for the first load, and the total harmonic distortions are made closer. In this way, a simpler circuit design can keep both total harmonic distortions within the standard.

In a realization of this second circuit implementation:
the resonant capacitor is connected to a first end of the second inductor component;
the first inductor component is connected between the reference output and a junction between the first and second inductor components;
the second inductor component is connected at a second end to the junction;
the first end of the second inductor component is connected to the first output through a first diode; and
the junction is connected to the second output through a second diode.

In this case, the high voltage output connects to the resonance capacitor, and the low voltage output connects to the junction between the inductor components.

In order to buffer both outputs, a first output capacitor may again be connected between the reference output and the second output to buffer the second output, and a second output capacitor is connected between the second output and the first output such that the first and the second output capacitor buffer the first output.

The invention also provides a lighting device comprising the resonant converter defined above, and a light emitting load connected to either the first output or the second output.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
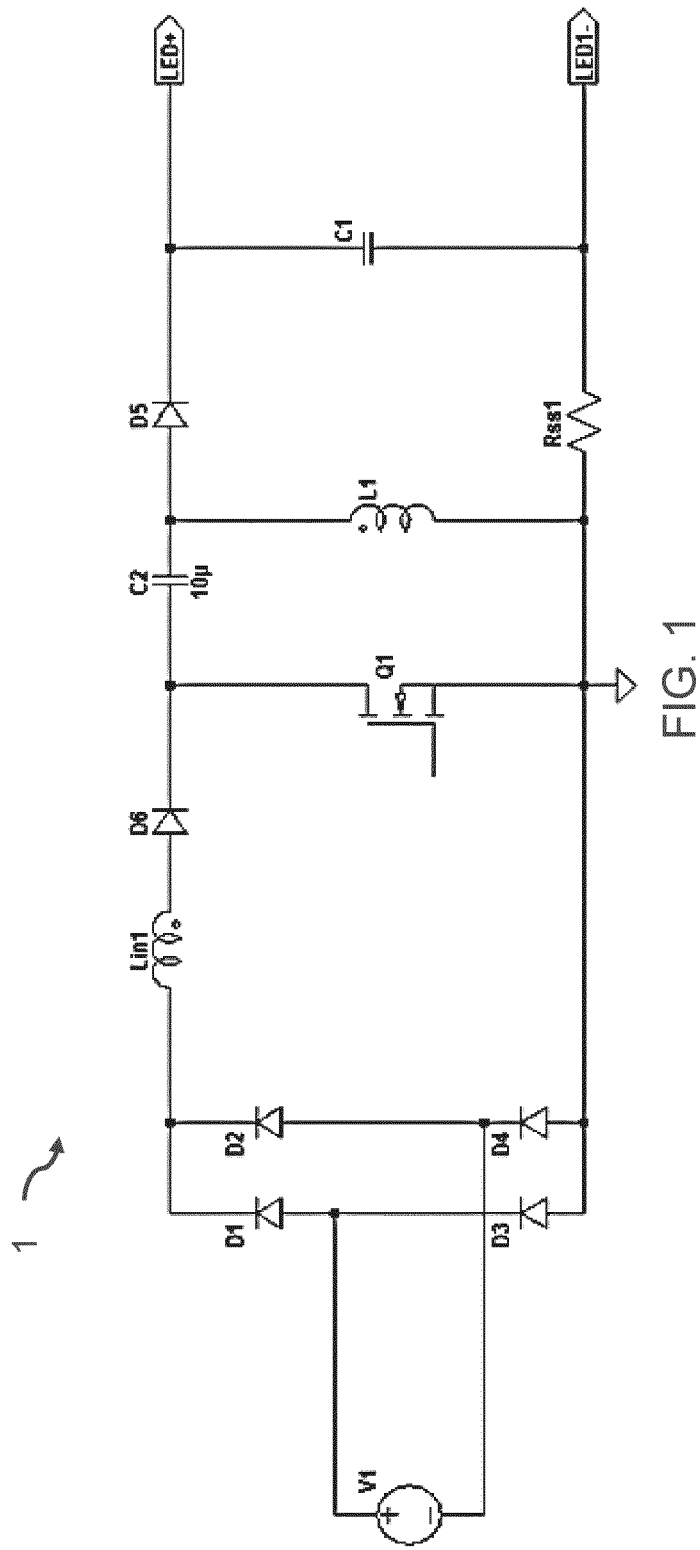
FIG. 1 shows a known SEPIC resonant converter.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a resonant converter which has a resonant capacitor between the input stage and the output stage. An output inductor arrangement of the output stage has a first inductor component and a second inductor component magnetically coupled. A first output is coupled to a reference output by both of the first and second inductor components in series and it connects to a first load with a first (high) forward voltage. A second output is coupled to the reference output by only one of the first and second inductor components, and connects to a second load with a second (low) forward voltage. A selected one output connects to a corresponding load at one time. This enables a large output voltage range with low total harmonic distortion and/or low voltage stress on the components of the input and output stages.

FIG. 1 shows a known SEPIC resonant converter 1.

The resonant converter comprises an AC input, represented by voltage source V1. The AC input connects to a diode bridge rectifier comprising diodes D1, D2, D3 and D4.

The rectified output is provided to an input stage in the form of a boost converter. The boost converter comprises a series inductor Lin1 and diode D6 and a parallel main switch Q1. The boost converter functions as a power factor correction (PFC) stage and is for providing low total harmonic distortion.

The resonant capacitor C2 connects to the input of an output stage, instead of connecting to ground as in a single stage boost converter. The resonant capacitor C2 is a bulk capacitor, typically an electrolytic capacitor (Elcap). The resonant capacitor C2 charges with the boost stage and discharges with an output inductor L1 thereby resonating.

The main switch Q1 controls the delivery of energy from the input to the inductor Lin1 (when the main switch Q1 is closed), and from the input plus the inductor Lin1 to the resonant capacitor C2 and to the output stage (when the main switch Q1 is open). This is effectively a boost conversion.

The output stage comprises a buck-boost converter (or it may comprise a boost converter). The buck-boost converter comprises a parallel inductor L1 and series diode D5 to the output LED+. The output stage is for achieving low output current ripple.

The main control switch Q1 is shared between the input stage and the output stage. Thus, in the buck-boost converter, the main switch controls the transfer of energy between the resonant capacitor C2 and the inductor L1 and between the inductor L1 and the output. An output filter capacitor C1 is provided across the output, which has a positive terminal LED+ and a negative terminal LED−. This is effectively a buck-boost conversion.

An output current sense resistor Rss1 is also shown, used as part of the control circuit for controlling the switching of the main switch Q1.

This circuit topology is sometimes known as a 1.5 stage topology.

In more detail, when the main switch Q1 turns on, the resonant capacitor C2 releases energy to the inductor L1 of the output stage. The power release from the resonant capacitor C2 in one cycle can be expressed as:

$$p_o = V_{bk} * \bar{I} = V_{bk} * \frac{1}{2} * \frac{V_{bk} * T_{on}}{L_1} * T_{on} * \frac{1}{T_p} = \frac{(V_{bk} * T_{on})^2}{2 * L_1 * T_p},$$

When the main switch Q1 turns off, the resonant capacitor C2 is charged by the input stage inductor Lin1, and the power input from the inductor Lin1 to the resonant capacitor is:

$$p_i = V_{bk} * \bar{I_i} = V_{bk} * \frac{1}{2} * \frac{v_{in} * T_{on}}{L_{in1}} * T_{rst} * \frac{1}{T_p} = \frac{v_{in} * T_{on} * T_{rst} * V_{bk}}{2 * L_{in1} * T_p},$$

Here, $v_{in} = \sqrt{2} V_{rms} * \sin(\omega t) = V_{amp} * \sin(\omega t)$, Trst is the boost inductor magnetic reset time.

Since Vin=Vamp*sin(wt), by power balancing during a half AC cycle:

$$\frac{1}{\pi} \int_0^\pi \frac{V_{amp}\sin(\omega t) T_{on} T_{rst} V_{bk}}{2 L_{in1} T_p} d\omega t = \frac{(V_{bk} T_{on})^2}{2 L_1 T_p}$$

By balancing Vin*Ton for the inductor Lin1:

$$T_{rst} = \frac{v_{in} * T_{on}}{V_{bk} + V_o - v_{in}}$$

The ratio between the PFC inductance and the magnetizing inductance is given by:

$$k_r = \frac{L_{in1}}{L_1} = \frac{1}{\pi * V_{bk}} \int_0^\pi \frac{[V_{amp} * \sin(\omega t)]^2}{V_{bk} + V_o - V_{amp} * \sin(\omega t)} d\omega t$$

These relationships give rise to the conclusions that when there is a fixed value of Kr (i.e. fixed inductor values), the higher the output voltage Vo, the lower the resonant capacitor voltage, and vice versa.

Figure 2:
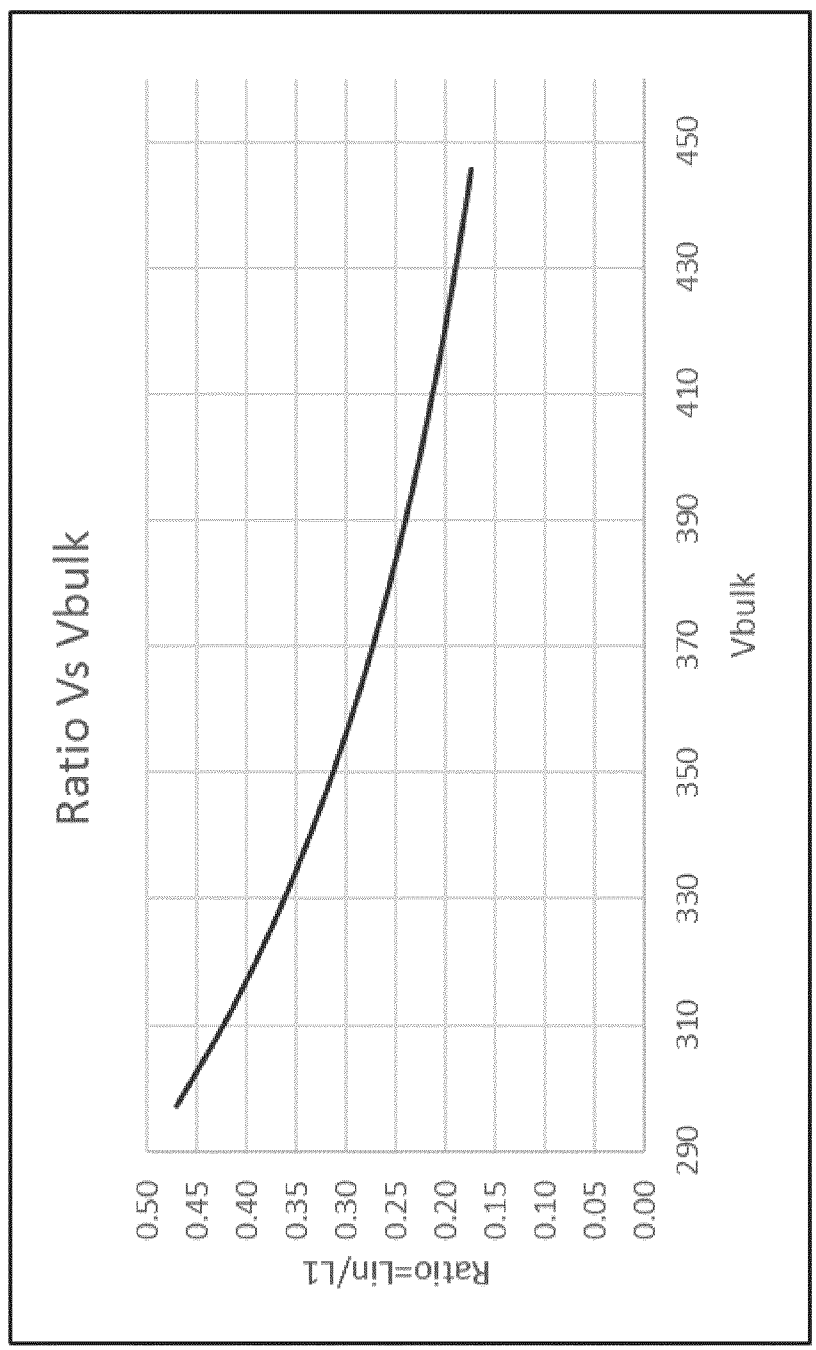
FIG. 2 shows the relationship between Kr (the ratio of the inductors in the input and output stages) and the resonant capacitor voltage Vbulk.

For given values of Vin and Vo, FIG. 2 shows the relationship between Kr (the ratio of the inductors in the input and output stages Lin1/L1) and the resonant capacitor voltage Vbulk.

By way of example, it is required than Vin can range between 220 Vac and 240 Vac, a power factor, PF, is required greater than 0.9, a total harmonic distortion, THD, is required of less than 20%, and most importantly an output voltage range is required of 50V to 200V. A constant current ripple is required to be less than <4%.

A problem with this kind of this topology results from the requirement for a large output voltage window (e.g. a ratio of 1:4 between 50V and 200V). First, it is difficult to meet the THD requirement within the whole output voltage window. Second, the voltage stress on the resonant capacitor C2 can also be too high. For example, a simulation shows the maximum voltage across C2 reaches 540V (with Vin=254 Vac and Vout=50V). This means a 600V capacitor is required, or two 300V capacitors in series.

The voltage stress on the main switch Q1 is higher than 650V so an 800V MOS transistor is for example chosen as the main switch Q1.

For the voltage stress on the capacitor C2, if a single static circuit design is used for both 200V and 50V output voltages, the following issues arise when designing the circuit.

For a maximum output voltage Vo=200V, the design aim is to ensure minimum component voltage stress. For example, if a minimum input voltage is 210V and the maximum output voltage is 200V, the boost converter will operate in critical conduction mode, CRM, at a 90 degree phase angle. The resonant capacitor C2 needs to be specified for slightly higher than the input peak voltage (210*√2*1.05=310 Vdc). The calculated inductor ratio is Ratio=Lin1/L1=0.41. For example inductor values of Lin1=1.15 mH and L1=2.8 mH may then be used.

Based on this inductor design, for an output voltage Vo=50V, the maximum resonant capacitor voltage occurs at the maximum input voltage Vin=254 Vac and the minimum output voltage Vo=50V. The resulting resonant capacitor voltage Vbulk=540V increases by more than 200V from the above value of 310V, which requires a very expensive high voltage 600V rated capacitor, or a bulky series connection of two 300V capacitors.

The total harmonic distortion, the THD is below 20% for an input voltage of 254 Vac and output voltage 200V and thus meets typical product specifications.

Figure 3:
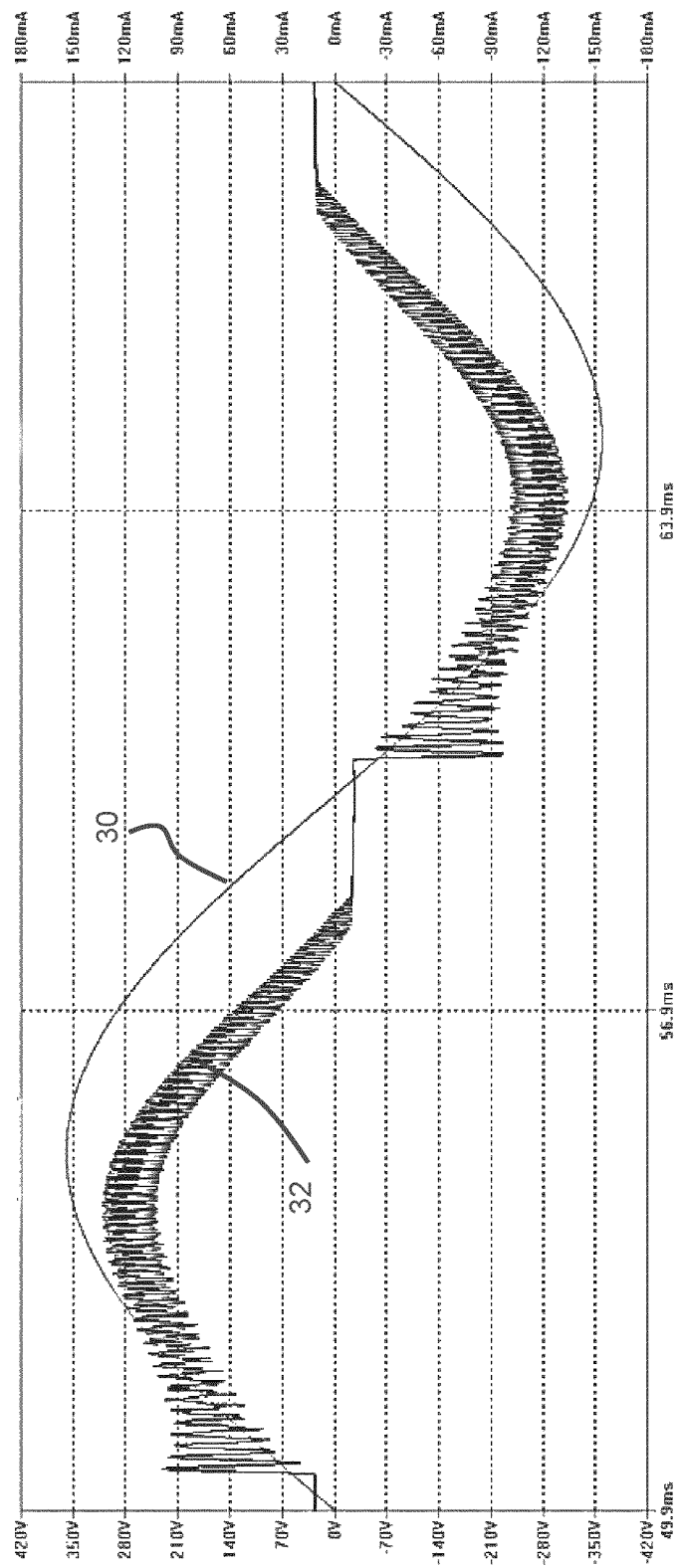
FIG. 3 shows a simulation of the input voltage and the input current for an input voltage of 254 Vac and output voltage 50V.

FIG. 3 shows a simulation of the input voltage 30 and the input current 32 for an input voltage of 254 Vac and a reduced output voltage of 50V. There is a phase shift of the input current as well as distortion. The result is a THD of 24% which then does not meet the typical product specifications.

Figure 4:
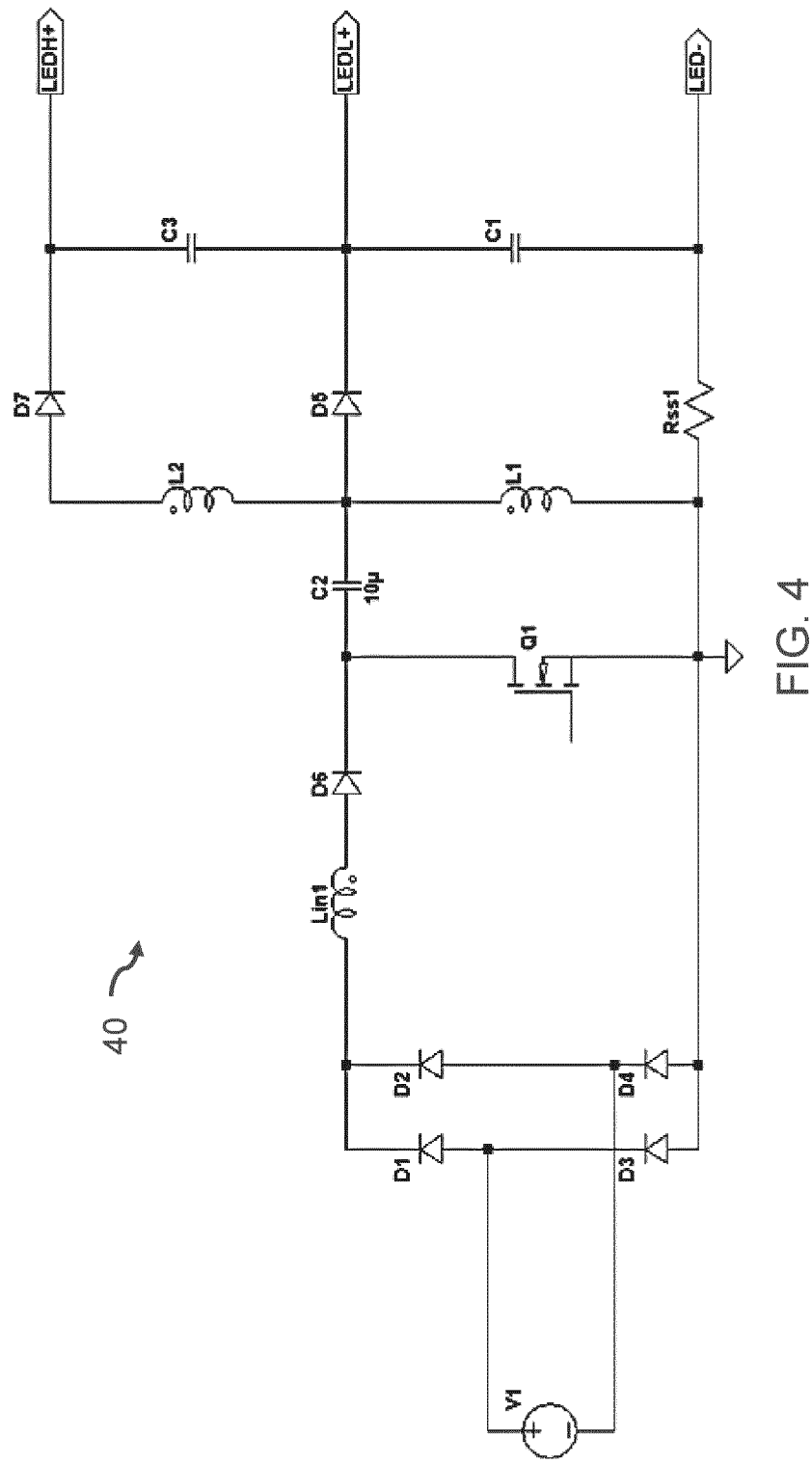
FIG. 4 shows a first example of a resonant converter.

FIG. 4 shows a first example of a resonant converter 40 according to a first embodiment of the invention.

As in the basic circuit above, the resonant converter comprises an AC input, represented by voltage source V1. The AC input connects to a diode bridge rectifier comprising diodes D1, D2, D3 and D4. The rectified output is provided to an input stage in the form of a boost converter. The boost converter comprises a series inductor Lin1 and diode D6 and a parallel main switch Q1. The boost converter functions as a power factor correction (PFC) stage.

The resonant capacitor C2 connects to the input of an output stage. As in the known circuit, the resonant capacitor is a bulk capacitor, typically an electrolytic capacitor (Elcap).

The output stage is modified in this circuit. It now comprises an output inductor arrangement L1, L2. The output inductor arrangement L1, L2 of the output stage is adapted to be charged by the resonant capacitor C2 between the input stage and the output stage.

More specifically, the output inductor arrangement L1, L2 comprises a first inductor component L1 and a second inductor component L2 magnetically coupled to each other. For example they share a common core.

The resonant capacitor C2 is connected to a junction between the first and second inductor components L1, L2. The first inductor component L1 is connected between the reference (ground) output LED− and the junction, and the second inductor component L2 is connected at a first end to the junction. The other end of the second inductor component L2 is connected to first output LEDH+ through a first diode D7. The junction between the inductor components is connected to the second output LEDL+ through a second diode D5.

Thus, the first output LEDH+ is coupled to the reference output LED− by both of the first and second inductor components L1, L2 in series, whereas the second output LEDL+ is coupled to the reference output LED− by only one the first inductor component.

Most importantly, the first output LEDH+ is for connection to a first load with a first, higher, forward voltage and the second output LEDL+ is for connection to a load with a second, lower, forward voltage. Thus, a load is connected to a selected one of the two outputs depending on the output voltage requirement of the load. The selected one of the first and second outputs is connected to a corresponding load at any given time. For example, if the resonant converter is adapted to drive a high voltage LED load, the resonant converter is adapted to connect to the high voltage load via the first output LEDH+, and the reference output LED−, while the second output LEDL+ is electrically floating. If the resonant converter is adapted to drive a low voltage LED load, the resonant converter is adapted to connect to the low voltage load via the second output LEDL+, and the reference output LED− while the first output LEDH+ is electrically floating.

By selecting which output terminal to use for a given load, the converter is able to meet performance requirements for use with a large output voltage range, such as 50V to 200V.

Different equivalent circuits result when the circuit is connected to different loads, using the different outputs.

Figure 5:
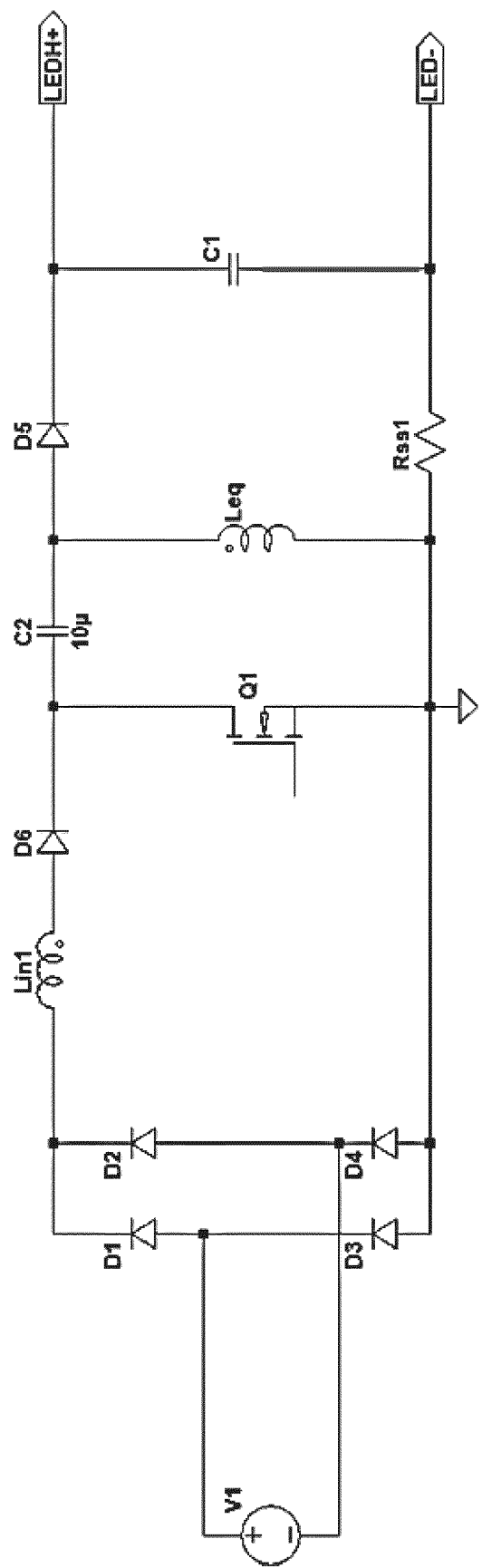
FIG. 5 shows an equivalent circuit when a 200V LED load is connected to the first output.

FIG. 5 shows an equivalent circuit when a 200V LED load is connected to the first output LEDH+.

The two inductors L1, L2 are replaced by a single equivalent inductor Leq. If L1=L2=Lm, the equivalent inductor Leq=Lm.

This equivalent inductance may be considered to be a circuitry parameter of the circuit.

The equivalent output voltage becomes 100V, where this equivalent output voltage is the voltage present at the output stage side of the resonant capacitor C2.

This equivalent output voltage may be considered to be a loading parameter of the circuit.

If the boost converter is again working at the critical conduction mode with 90 degree phase angle, for the same simulation as mentioned above, the equivalent output voltage is 100V (actual Vo=200V), Vin=210 Vac, The resonant capacitor C2 is again specified slightly higher than the input voltage peak value of 210*√2*1.05=310 Vdc.

The required ratio of the boost inductor and the secondary inductor now becomes Lin1/L1=0.82. This can for example be achieved by setting set Lin1=1.15 mH, L1=1.4 mH.

Figure 6:
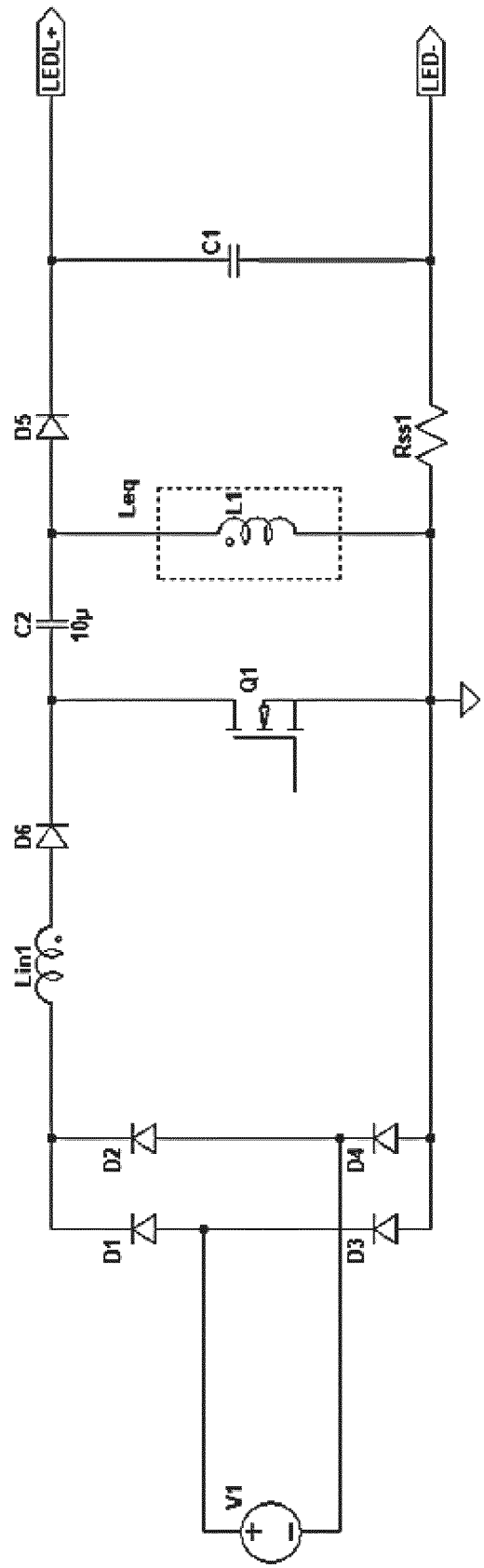
FIG. 6 shows an equivalent circuit when a 50V LED load is connected to the second output.

FIG. 6 shows an equivalent circuit when a 50V LED load is connected to the second output LEDL+.

Only the inductor L1 is being used, if L1=Lm as in the circuit of FIG. 5, Leq=Lm. The effective output voltage is now the actual output voltage, i.e. 50V.

It can be seen that for the two loads, the equivalent inductance (the circuitry parameter) is the same as Lm. For the 50V case, the equivalent output voltage is 50V.

Thus, the circuitry parameter has effective values of 50V and 100V (a ratio of 1:2) for a ratio of real output voltage of 1:4 (50V to 200V). The circuit can then be considered as a single circuit topology to drive a 50V load and a 100V load. The resonant capacitor voltage Vbulk can thus be controlled more easily within an acceptable range.

For example, the maximum resonant capacitor voltage occurs when Vin=254 Vac and the equivalent output voltage is 50V. The resonant capacitor becomes Vbulk=440V, which is lower than the previous design of 540V. A 450V rated capacitor can be chosen, which is cheaper than a 600V rated capacitor and less bulky than a series connection of two 300V capacitors.

Thus, it can be seen that when the first output LEDH+ is connected to the load, the resonant converter is adapted to work with a first circuitry parameter (e.g. inductance Lm) and a first loading parameter (e.g. equivalent voltage 100V), and when the second output LEDL+ is connected to the second load, the resonant converter is adapted work with a second circuitry parameter (e.g. inductance Lm) and a second loading parameter (e.g. equivalent voltage 50V).

A difference between the first and second circuitry parameters is for example less than a first threshold (the difference is zero in this example because the first and second equivalent inductances are the same), and a difference between the first and the second loading parameters is less than a second threshold (the difference is 50V in this example).

The first threshold is for example a fraction of the first circuitry parameter (CP1), e.g. 10%. Thus, in this example the threshold is 0.1×CP1. The second circuitry parameter (CP2) is then in the range 0.9CP1 to 1.1CP1 so that the difference is less than 0.1CP1.

The second threshold is for example a voltage amount. In the example shown, the difference between the first and second equivalent output voltages is 50V. It is smaller than the difference between the first and second forward voltages (150V in this example).

The second threshold is for example the difference between the maximum and minimum output voltages (the 150V in this example). The second threshold may for example be smaller, such as a fraction of this difference, e.g. half of this difference (so 75V in this example). The result is that a difference of the voltage stresses on the resonant capacitor C2 when connected to the first load and to the second load is less than a third, stress, threshold.

In this example, the difference in voltage stresses is 440V−310V=130V. Without the circuit modification, the voltage stress difference was 540V−310V=230V. Thus, the difference is voltage stresses on the resonant capacitor is reduced from 230V to 130V and the stress threshold is for example 150V. The stress threshold is for example the difference between the maximum and minimum output voltages (the 150V in this example).

By keeping the voltage stress on the resonant capacitor below a stress threshold, the voltage stresses on the resonant capacitor for the high voltage load and the low voltage load are made closer, and a lower specification component (i.e. resonant capacitor) may be used.

Figure 7:
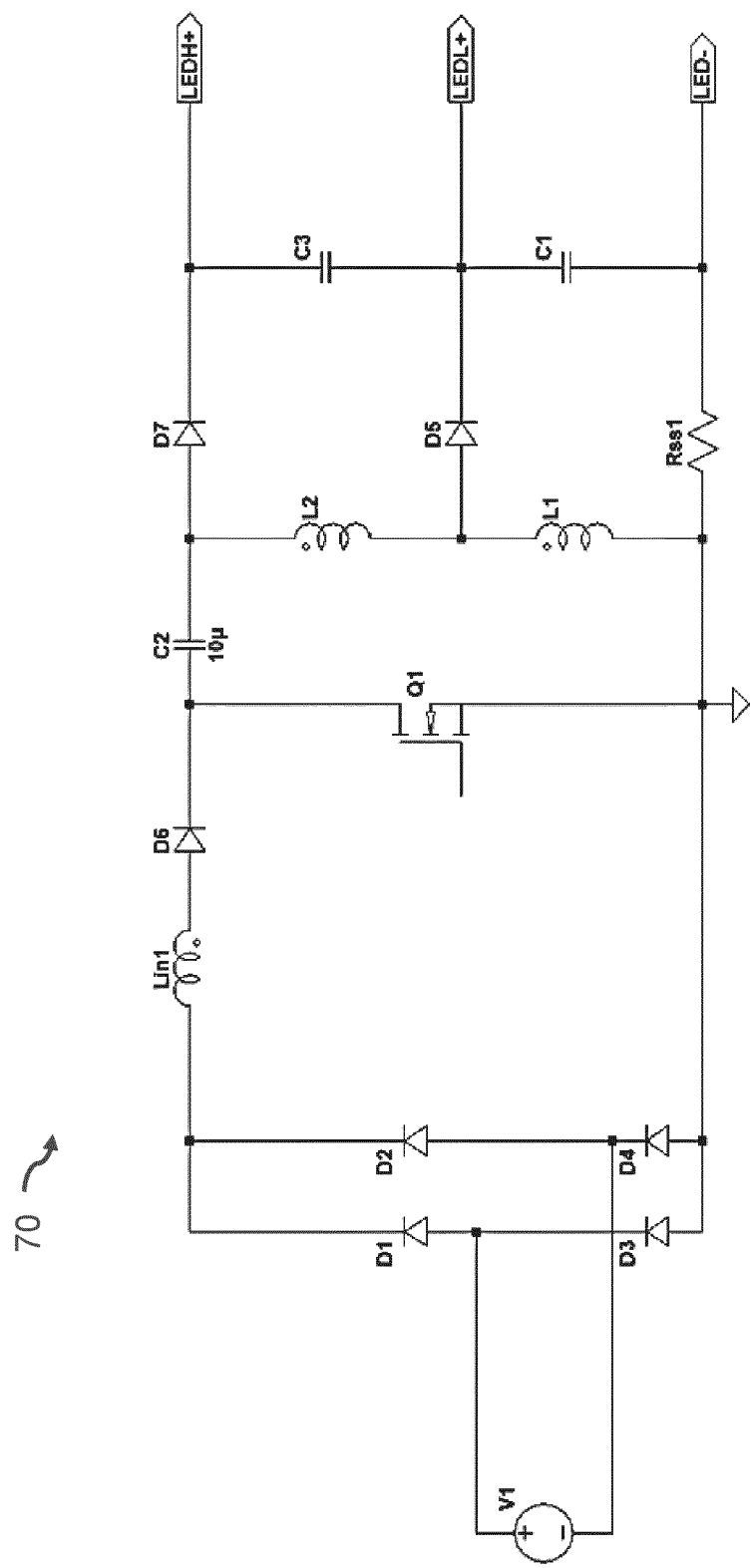
FIG. 7 shows a second example of a resonant converter.

FIG. 7 shows a second example of a resonant converter in particular to increase the reflected voltage when applied to the same output voltage and thereby improve the total harmonic distortion (THD).

As in the basic circuit above and in the first example, the resonant converter comprises an AC input, represented by voltage source V1. The AC input connects to a diode bridge rectifier comprising diodes D1, D2, D3 and D4. The rectified output is provided to an input stage in the form of a boost converter. The boost converter comprises a series inductor Lin1 and diode D6 and a parallel main switch Q1. The boost converter functions as a power factor correction (PFC) stage. The resonant capacitor C2 connects to the input of an output stage. The resonant capacitor is a bulk capacitor, typically an electrolytic capacitor (Elcap).

The output stage is modified differently in this circuit. It again comprises an output inductor arrangement with a first inductor component L1 and a second inductor component L2 magnetically coupled to each other and in series.

In this circuit, the resonant capacitor C2 is connected to a first end of the second inductor component L2. The other, second, end of the second inductor component L2 is at the junction between the first and second inductor components L1, L2.

The first inductor component L1 is connected between the reference output LED− (i.e. ground) and the junction between the first and second inductor components L1, L2.

The first end of the second inductor component L2 is connected to the first output LEDH+ through a first diode D7 and the junction is connected to the second output LEDL+ through a second diode D5.

A first output capacitor C1 is again connected between the reference output and LED− the second output LEDL+ and a second output capacitor C3 is connected between the second output LEDL+ and the first output LEDH+.

This circuit is based on creating a higher reflected voltage to lower the total harmonic distortion, wherein the reflected voltage is the voltage on the output inductor arrangement as seen by the resonant capacitor.

Figure 8:
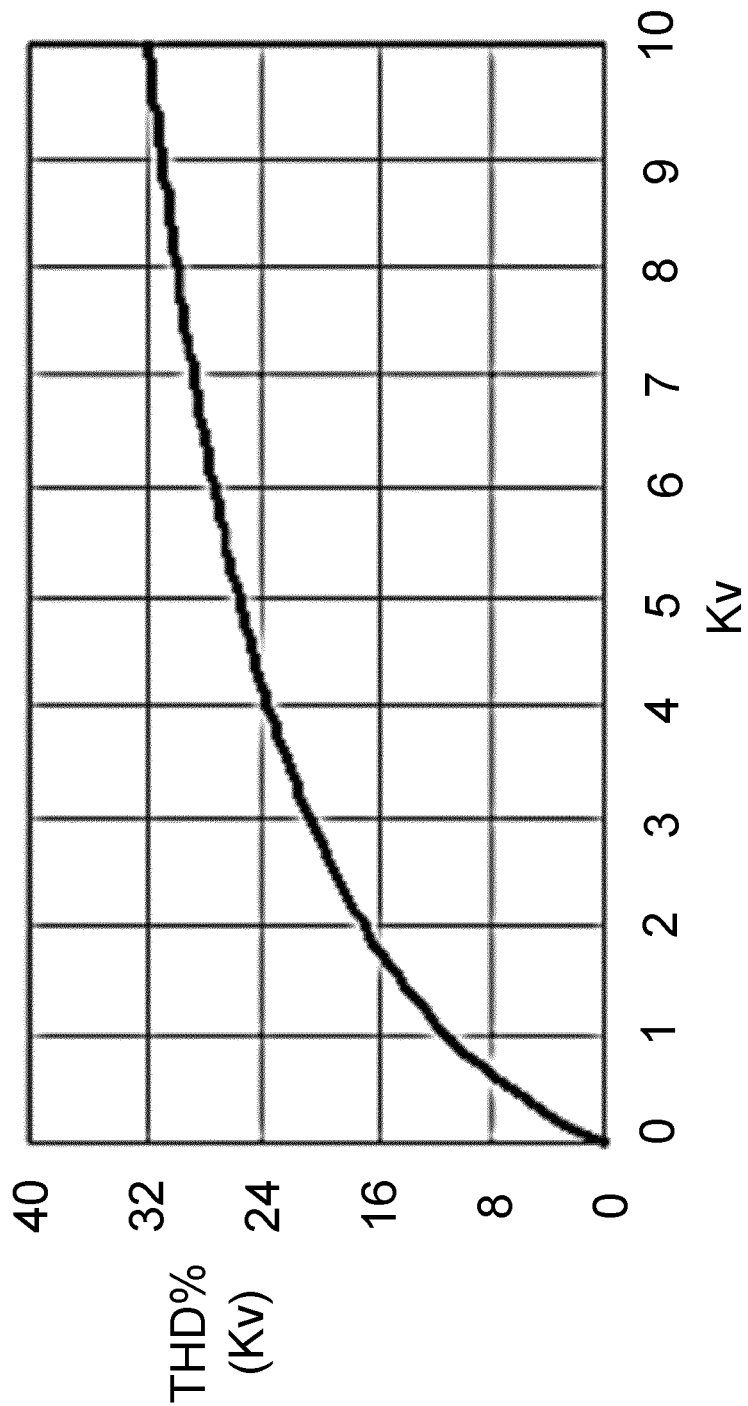
FIG. 8 shows the total harmonic distortion versus the value Kv, which is the ratio of the line peak voltage $V_{PK}$ to the reflected voltage $V_R$ for the output stage.

FIG. 8 shows the total harmonic distortion versus the value Kv, which is the ratio of the line peak voltage $V_{PK}$ to the reflected voltage $V_R$ for output stage.

FIG. 8 shows that the closer the line peak voltage $V_{PK}$ and the reflected voltage $V_R$, the smaller the THD. This principle applies to the SEPIC converter.

The reflected voltage is the voltage from the cathode of the resonant capacitor C2 to ground (namely the output inductor's voltage).

This topology addresses the issue explained above that when the topology is designed thereby the THD being acceptable at a loading condition for a 200V LED load, the THD deteriorates to 24% when the loading condition changes to a 50V LED load.

Figure 9:
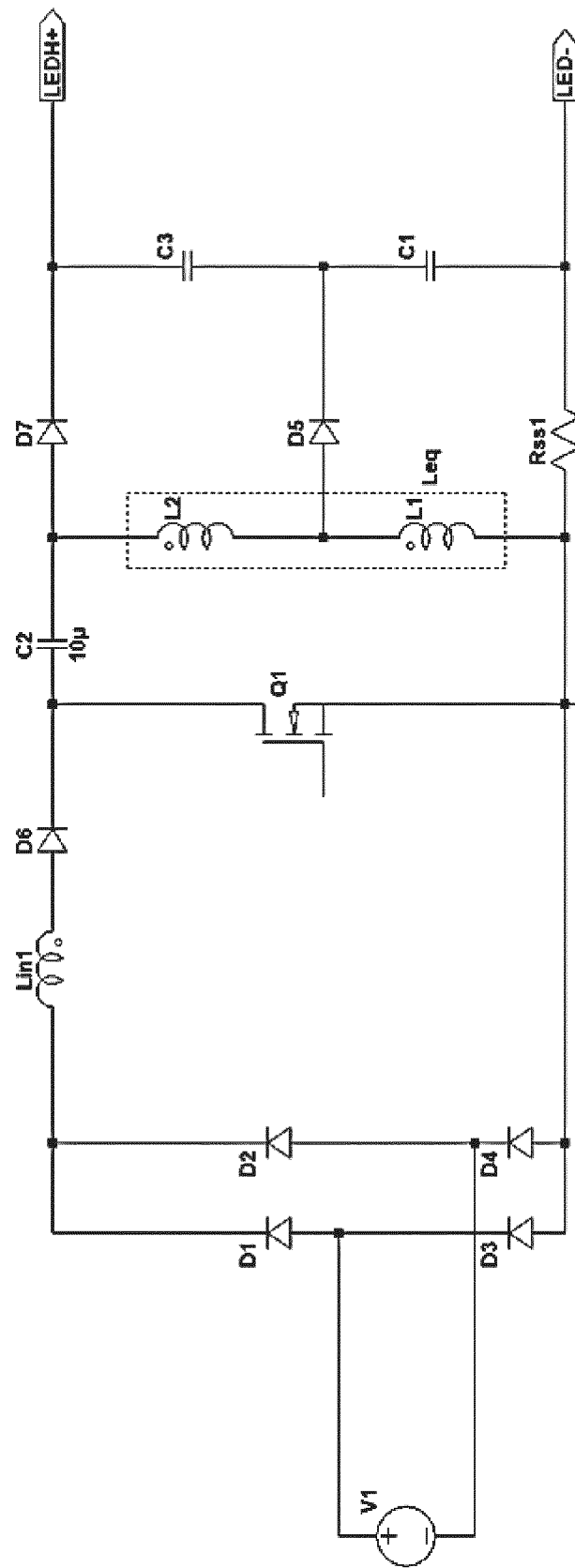
FIG. 9 shows the equivalent circuit when the 200V load is connected.

FIG. 9 shows the equivalent circuit when the 200V load is connected. The circuitry parameter in this case is the inductance seen by the resonant capacitor C2 (i.e. the equivalent inductance connected to the capacitor C2). Again, with L1=L2=Lm, the first circuitry parameter is 2Lm.

The loading parameter is again the voltage seen by the resonant capacitor which is 200V in this case.

The voltage seen by the resonant capacitor, and hence the first loading parameter, is 200V and the circuit is designed to have a THD of 9.3%, meeting the 20% THD requirement.

Figure 10:
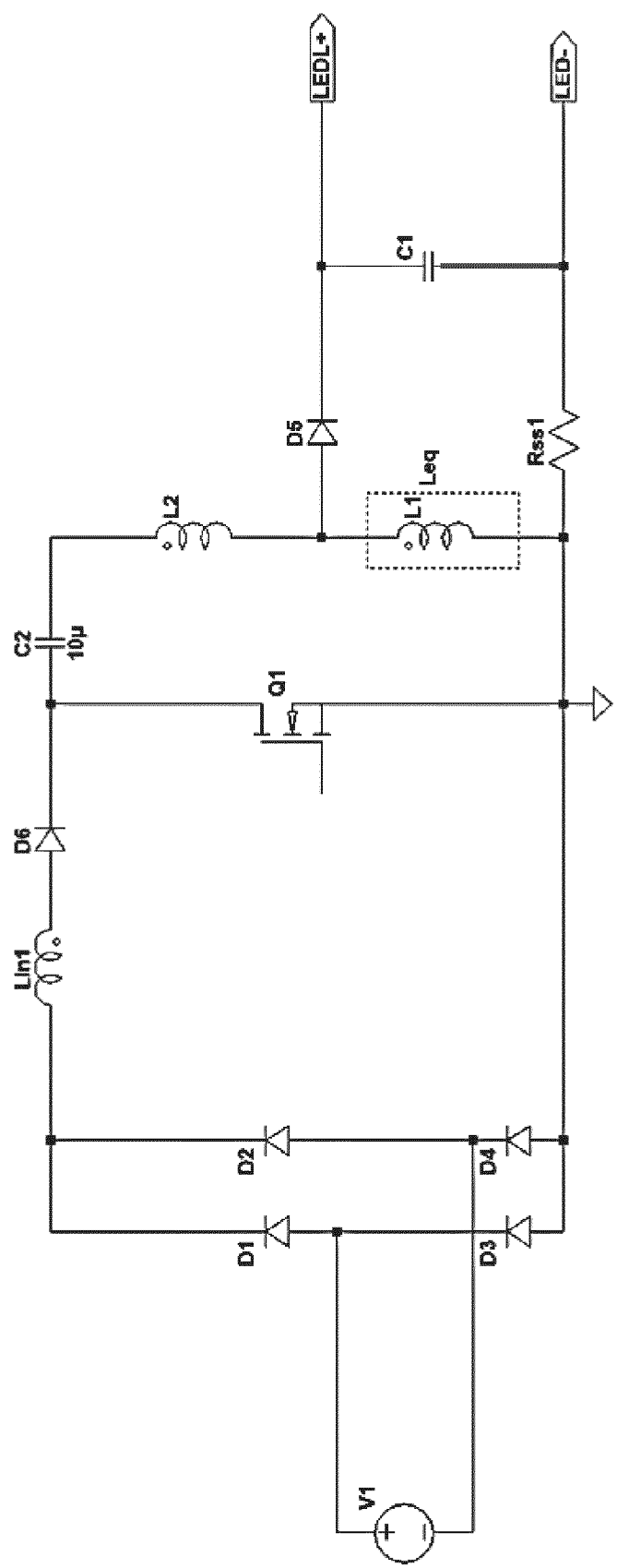
FIG. 10 shows the equivalent circuit when the 50V load is connected.

FIG. 10 shows the equivalent circuit when the 50V load is connected. Again, with L1=L2=Lm, the effective output inductance is 0.5Lm. However, in this case the second circuitry parameter (the equivalent inductance at the output of the resonant capacitor) is still 2Lm.

Although the voltage LEDL+ to LED− is 50V, the coupled inductor L2 is induced with the same voltage as L1, thus a voltage as seen by the capacitor C2 (cathode to ground) is 100V. Thus, the second loading parameter is 100V.

This 100V voltage is comparable with the 200V in the 200V load case, and the THD is 13%, hence still below 20%.

Thus, in this case, the first loading parameter comprises a first inductor voltage of the output inductor arrangement as seen by the resonant capacitor and the second loading parameter comprises a second inductor voltage of the output inductor arrangement as seen by the resonant capacitor.

The difference between the first inductor voltage when connected to the first load and the second inductor voltage when connected to the second load (in this case 100V) is smaller than the difference between the first and second forward voltages (in this case 150V). As a result, the total harmonic distortions of the resonant converter both when connected to the first load and when connected to the second load is below the required level of 20%.

Figure 11:
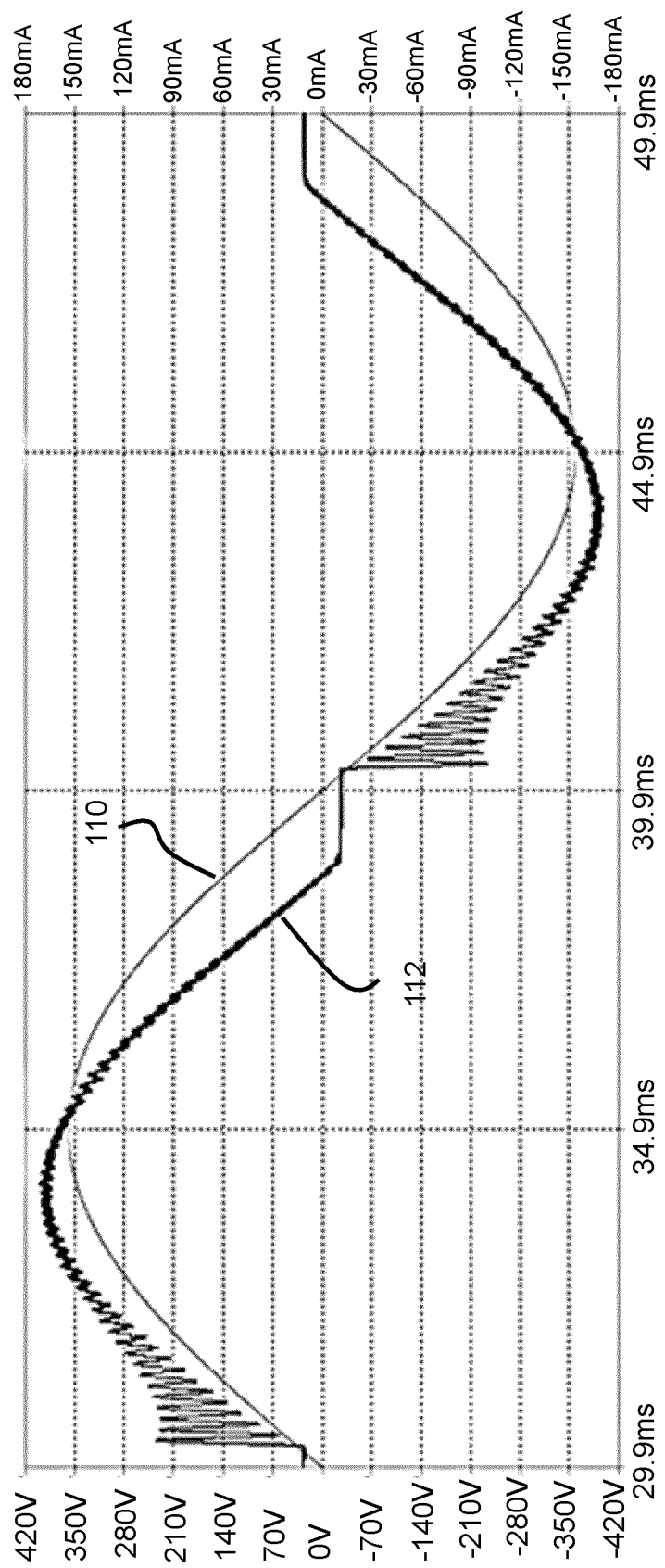
FIG. 11 shows a simulation of the input voltage and the input current for the circuit of FIG. 7 for an input voltage of 254 Vac and output voltage 50V.

FIG. 11 shows a simulation of the input voltage 110 and the input current 112 for the circuit of FIG. 7 for an input voltage of 254 Vac and output voltage 50V. There is a reduced phase shift of the input current as well as reduced distortion. The result is a THD of 13% which meets typical product specifications.

In use, a light emitting load, in particular a LED load, is connected to either the first output or the second output, for both circuits above. The customer is for example instructed to connect LEDH+ and LED− when the output voltage is in a first range such as 100V-200V in the application. The customer connects LEDL+ and LED− when the output voltage is the range of 50V-100V in application.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage. If the term "adapted to" is used in the claims or description, it is noted the term "adapted to" is intended to be equivalent to the term "configured to".

Any reference signs in the claims should not be construed as limiting the scope.

The invention claimed is:

1. A resonant converter comprising:
an input stage;
an output stage comprising an output inductor arrangement; and
a resonant capacitor between the input stage and the output stage;
wherein at least part of the output inductor arrangement of the output stage is adapted to be electrically connected in parallel with said resonant capacitor and charged by said resonant capacitor,
wherein the output inductor arrangement comprises a first inductor component and a second inductor component magnetically coupled to each other, and wherein the output stage further comprises:
a first output coupled to a reference output by both of the first inductor component and the second inductor component in series and adapted to connect to a first load with a first forward voltage, wherein the first inductor component and the second inductor component is adapted to convert the output voltage into a smaller effective output voltage for the resonant converter; and
a second output coupled to the reference output by only one of the first and second inductor components, and adapted to connect to a second load with a second forward voltage smaller than the first forward voltage, wherein given only one of the first load and the second load being driven by the resonant converter at one time, the first output is adapted to connect to the first load always and the second output is adapted to be electrically floating always, or the second output is adapted to connect to the second load always and the first output is adapted to be electrically floating always.

2. The resonant converter of claim 1, wherein the input stage comprises a boost converter and the output stage comprises a buck converter or a buck-boost converter, wherein a main control switch is shared between the boost converter as the input stage and the buck converter or the buck-boost converter as the output stage.

3. The resonant converter of claim 2, wherein the resonant capacitor is connected between the main control switch and the output inductor arrangement.

4. The resonant converter of claim 1, wherein the resonant converter is a SEPIC converter.

5. The resonant converter of claim 4, wherein when the first output is connected to the first load, the resonant converter is adapted to work with a first circuitry parameter and a first loading parameter, and when the second output is connected to the second load, the resonant converter is adapted work with a second circuitry parameter and a second loading parameter, and the difference between the first and second circuitry parameters is less than the first threshold, and/or the difference between the first and the second loading parameters is less than the second threshold such that the performance of the resonant converter is maintained with respect to the first load and the second load.

6. The resonant converter of claim 1, wherein the first circuitry parameter comprises a first equivalent inductance of the output inductor arrangement, and the second circuitry parameter comprises a second equivalent inductance of the output inductor arrangement, wherein the first and the second equivalent inductances are substantially same.

7. The resonant converter of claim 6, wherein the first loading parameter comprises a first equivalent output voltage of the resonant converter, the second load parameter comprises a second equivalent output voltage of the resonant converter, wherein the difference between the first and second equivalent output voltages is smaller than the difference between the first and second forward voltages such that the voltage stresses on the resonant capacitor when connected to the first load and to the second load are both less than a stress threshold.

8. The resonant converter of claim 6, wherein the inductance of the first and second inductor components are the same, the first equivalent output voltage is half of the first forward voltage, and the second equivalent output voltage is the second forward voltage.

9. The resonant converter of claim 6, wherein:
the resonant capacitor is connected to a junction between the first and second inductor components;
the first inductor component is connected between the reference output (LED) and the junction;
the second inductor component is connected at a first end to the junction;
the second inductor component is connected at a second end to the first output through a first diode; and
the junction is connected to the second output through a second diode.

10. The resonant converter of claim 9, wherein a first output capacitor is connected between the reference output and the second output and a second output capacitor is connected between the second output and the first output.

11. The resonant converter of claim 5, wherein the first loading parameter comprises a first inductor voltage of the output inductor arrangement as seen by the resonant capacitor, the second loading parameter comprises a second inductor voltage of the output inductor arrangement as seen by the resonant capacitor, wherein the difference between the first inductor voltage when connected to the first load and the second inductor voltage when connected to the second load is smaller than the difference between the first and second forward voltages such that the total harmonic distortions when connected to the first load and when to the second load are both less than a total harmonic distortion threshold.

12. The resonant converter of claim 5, wherein the inductance of the first and second inductor components are the same, the first inductor voltage is the first forward voltage, and the second inductor voltage is twice the second forward voltage.

13. The resonant converter of claim 5, wherein:
the resonant capacitor is connected to a first end of the second inductor component;
the first inductor component is connected between the reference output and a junction between the first and second inductor components;
the second inductor component is connected at a second end to the junction;
the first end of the second inductor component is connected to the first output through a first diode; and
the junction is connected to the second output through a second diode.

14. The resonant converter of claim 13, wherein a first output capacitor is connected between the reference output and the second output and a second output capacitor is connected between the second output and the first output.

15. A lighting device comprising:
an AC input,
a diode bridge rectifier,
the resonant converter of claim 1, wherein the input stage is electrically connected to the AC input via the diode bridge rectifier, and
a light emitting load electrically connected to either the first output or the second output.

* * * * *